United States Patent
Sodagar

(10) Patent No.: US 12,299,493 B2
(45) Date of Patent: May 13, 2025

(54) METHOD AND APPARATUS FOR SCHEDULING WORKFLOW ON CLOUD PLATFORMS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 520 days.

(21) Appl. No.: 17/702,198

(22) Filed: Mar. 23, 2022

(65) Prior Publication Data
US 2023/0019761 A1    Jan. 19, 2023

Related U.S. Application Data

(60) Provisional application No. 63/218,815, filed on Jul. 6, 2021.

(51) Int. Cl.
G06F 9/50    (2006.01)

(52) U.S. Cl.
CPC .......... G06F 9/5038 (2013.01); G06F 9/5066 (2013.01)

(58) Field of Classification Search
CPC .............................. G06F 9/5038; G06F 9/5066
See application file for complete search history.

(56) References Cited

U.S. PATENT DOCUMENTS

| | | | |
|---|---|---|---|
| 2019/0222621 A1 | 7/2019 | Kolan et al. | |
| 2020/0134191 A1 | 4/2020 | Strein et al. | |
| 2020/0226716 A1* | 7/2020 | Um | H04N 23/698 |
| 2021/0004273 A1* | 1/2021 | You | G06F 9/5027 |
| 2021/0096904 A1 | 4/2021 | Sodagar | |
| 2021/0105338 A1* | 4/2021 | Oyman | H04L 12/2876 |
| 2024/0184632 A1* | 6/2024 | You | G06F 9/5033 |

FOREIGN PATENT DOCUMENTS

WO    2021/062111 A1    4/2021

OTHER PUBLICATIONS

International Search Report dated Aug. 11, 2022 in International Application No. PCT/US2022/024543.
Written Opinion of the International Searching Authority dated Aug. 11, 2022 in International Application No. PCT/US2022/024543.
Taejun Jung et al., "Proposal on a functional MPE for SR (SR_MPE) with extended NBMP workflow" SK telecom, PIXTREE, Sep. 2018, Hague, Netherland, Oct. 8, 2018-Oct. 12, 2018, (6 pages).
Extended European Search Report dated Jul. 7, 2023 in Application No. 22838180.2.
"Text of ISO/IEC FDIS 23090-8 Network-based media processing", ISO/IEC JTC 1/SC 29/WG 11 N19062, Systems Subgroup, Apr. 28, 2020, 105 pages.

* cited by examiner

*Primary Examiner* — Dong U Kim
(74) *Attorney, Agent, or Firm* — Sughrue Mion, PLLC

(57) ABSTRACT

There is provided a method for scheduling a Network Based Media Processing (NBMP) workflow on a cloud platform. The method includes obtaining an input workflow including input media stream, generating a modified workflow by dividing the input media stream into one or more tasks, scheduling the one or more tasks on the cloud platform based on a schedule descriptor, which includes schedule type information and processing the modified workflow based on the scheduling of the one or more tasks.

20 Claims, 6 Drawing Sheets

METHOD AND APPARATUS FOR SCHEDULING WORKFLOW ON CLOUD PLATFORMS

CROSS-REFERENCE TO RELATED APPLICATION

This application is based on and claims priority to U.S. Provisional Patent Application No. 63/218,815, filed on Jul. 6, 2021, the disclosure of which is incorporated by reference herein in its entirety.

FIELD

Embodiments of the disclosure relate to apparatuses and methods for scheduling a Network Based Media Processing (NBMP) workflow or a part of the workflow on cloud platforms.

BACKGROUND

A network and cloud platform may be used to run various applications. The Network Based Media Processing (NBMP) standard provides a specification for defining, instantiating, and running workflows on cloud platforms. In some cases, the workflows can be run in parts, task by task, or a group of tasks at each time. In such cases, real-time processing of the workflows may not be a requirement, and taking into account, the limited computational resources allocated for the workflow or in order to avoid peak traffic time on the cloud, a workflow may be needed to be scheduled. However, the current functionalities of the NBMP standard does not provide a for scheduling a workflow or a part of the workflow on cloud platforms. One or more example embodiments of the disclosure may solve this issue and provide methods for scheduling a workflow or a part of the workflow on cloud platforms.

SUMMARY

One or more example embodiments of the disclosure provide a method and an apparatus for scheduling a workflow or a part of the workflow on cloud platforms.

According to an aspect of the disclosure, there is provided a method for scheduling a Network Based Media Processing (NBMP) workflow on a cloud platform, the method including: obtaining an input workflow including input media stream, generating a modified workflow by dividing the input media stream into one or more tasks, scheduling the one or more tasks on the cloud platform based on a schedule descriptor, which includes schedule type information and processing the modified workflow based on the scheduling of the one or more tasks.

According to another aspect of the disclosure, there is provided an apparatus for scheduling a Network Based Media Processing (NBMP) workflow on a cloud platform, the apparatus including: at least one memory configured to store program code; and at least one processor configured to read the program code and operate as instructed by the program code, the program code including: obtaining code configured to cause the at least one processor to obtain an input workflow including input media stream, generating code configured to cause the at least one processor to generate a modified workflow by dividing the input media stream into one or more tasks, scheduling code configured to cause the at least one processor to schedule the one or more tasks on the cloud platform based on a schedule descriptor, which includes schedule type information and processing code configured to cause the at least one processor to process the modified workflow based on the scheduling of the one or more tasks.

According to another aspect of the disclosure, there is provided a non-transitory computer readable medium storing instructions, the instructions including: one or more instructions that, when executed by at least one processor of an apparatus for scheduling a Network Based Media Processing (NBMP) workflow on a cloud platform, cause the at least one processor to: obtain an input workflow including input media stream, generate a modified workflow by dividing the input media stream into one or more tasks, schedule the one or more tasks on the cloud platform based on a schedule descriptor, which includes schedule type information and process the modified workflow based on the scheduling of the one or more tasks.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

Figure 1:
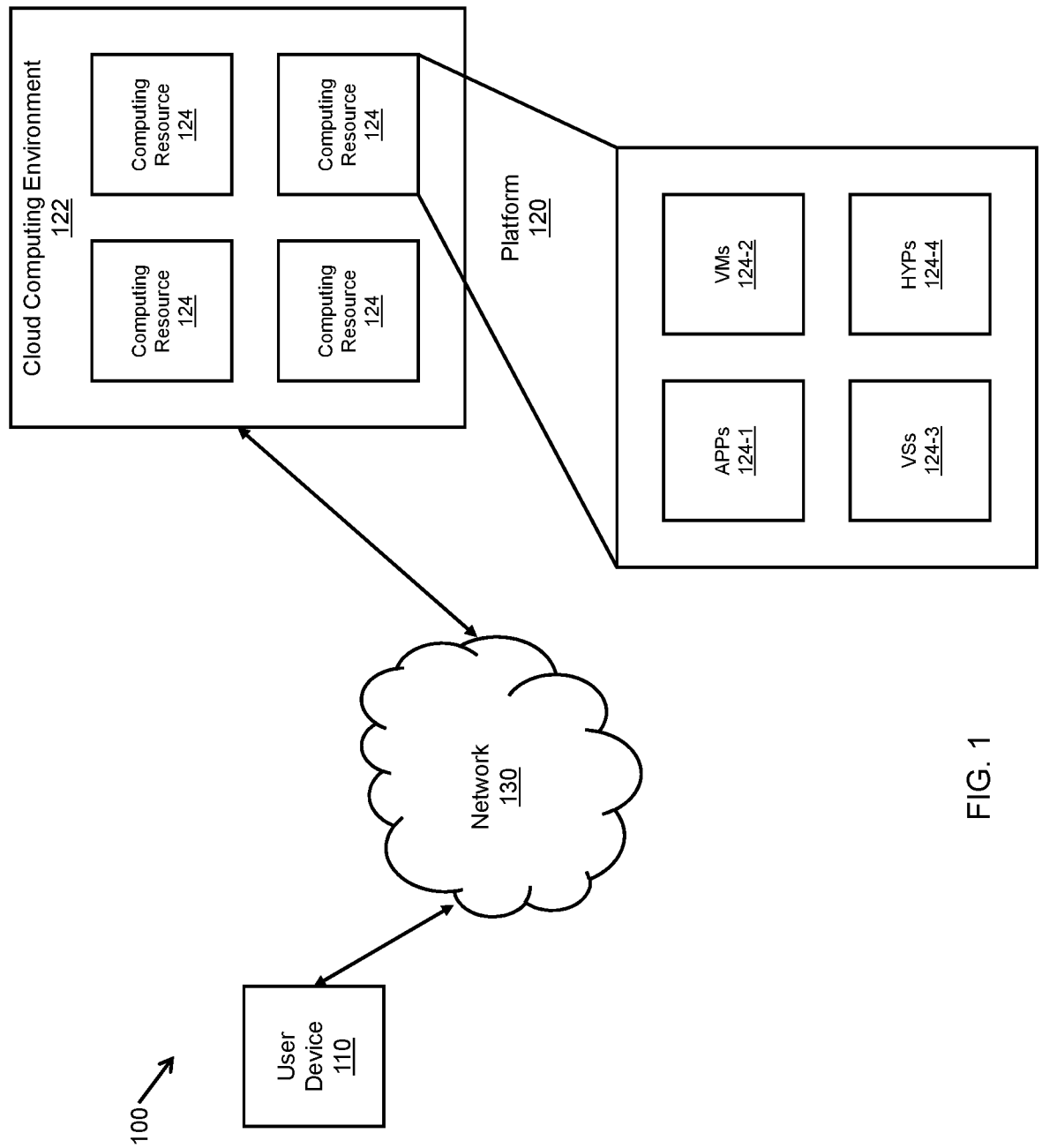
FIG. 1 is a schematic illustration of a communication system, according to one or more embodiments.

Embodiments of the disclosure relates to a method and an apparatus for signaling modifications in a network based media processing (NBMP) workflow, in particular, to apparatuses and methods for performing a step-based operation in media processing on a cloud platform.

Embodiments of the disclosure are exemplary in nature, and are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale. A same reference numeral in the accompanying drawings represents same or similar components, and therefore repeated descriptions of the components are omitted.

The proposed features discussed below may be used separately or combined in any order. Some block diagrams shown in the accompany drawings are functional entities and do not necessarily correspond to physically or logically independent entities. Further, the embodiments may be implemented in the form of hardware, which may include processing circuitry (e.g., one or more processors or one or more integrated circuits) or microcontroller apparatuses, implemented in the form of software, implemented in different networks and/or processor apparatuses or implemented by a combination of hardware and software components. In one example, the one or more processors execute computer program code that is stored in a one or more non-transitory computer-readable media.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 may include one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 may include one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may include an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 may include one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like. However, the disclosure is not limited thereto, and as such, according other example embodiment, the computing resource 124 may include other type of cloud resources.

The application 124-1 may include one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
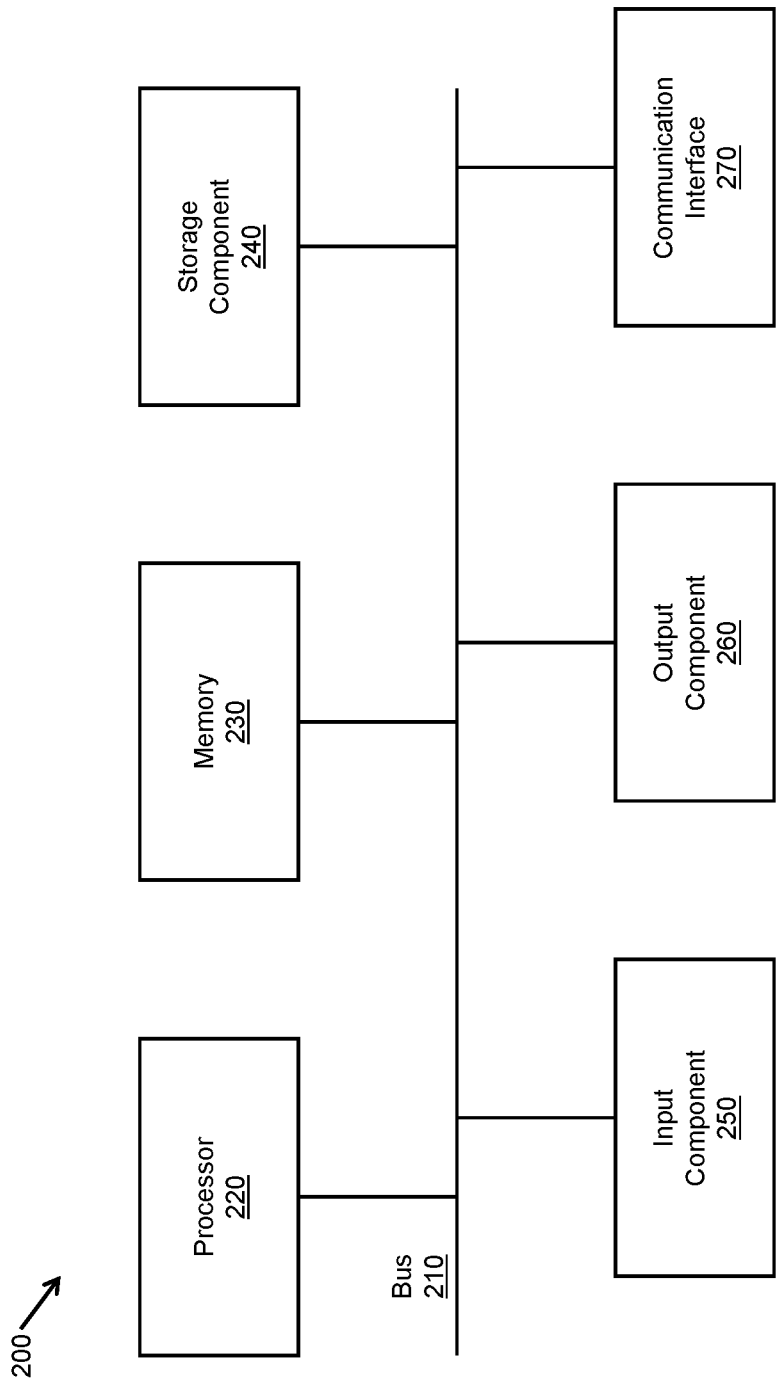
FIG. 2 is a simplified example illustration of a streaming environment, according to one or more embodiments.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 may include a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
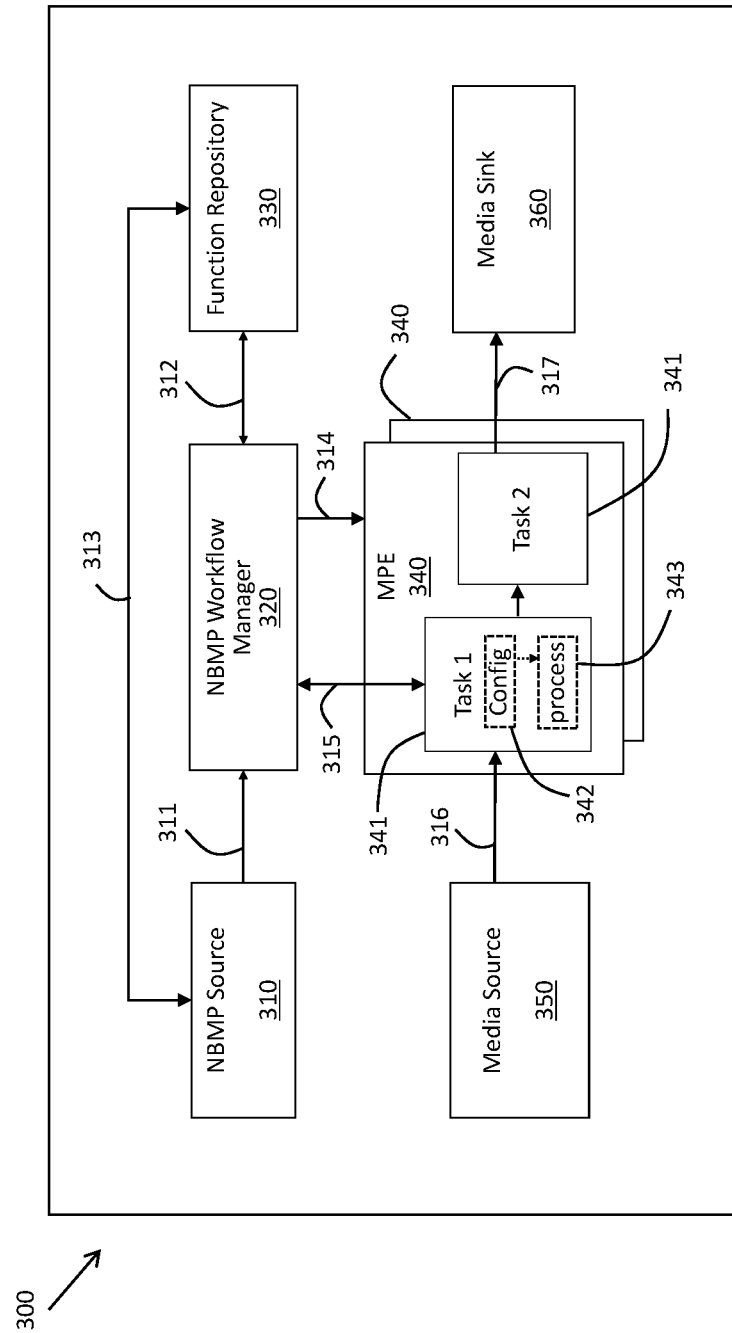
FIG. 3 is a block diagram of an NBMP system, according to one or more embodiments.

In an embodiment of the disclosure, a Network-Based Media Processing (NBMP) system is provided. FIG. 3 illustrates a NBMP architecture 300 according to embodiments herein and may be implemented with respect to cloud processing. The NBMP system 300 comprises an NBMP source 310, an NBMP workflow manager 320, a function repository 330, one or more media processing entities (MPE) 340, a media source 350, and a media sink 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 360, and media sink 360, respectively.

The NBMP source 310 may communicate work flow descriptions with the NBMP workflow manager 320 via a NBMP workflow API 311. The NBMP source 310 may also communicate function descriptions with the function repository 330 via a function discovery API 313. For example, the NBMP source 310 may send workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP workflow manager 320 may communicate with the function repository 330 via a function discovery API 312, which may be a same or different API from the function discovery API 313, and may communicate with one or more of the MPE 340 via an API 314 (e.g. an MPE API).

The media processing entities (MPE) 340 may include one or more tasks 341. The NBMP workflow manager 320 may also communicate with the tasks 341 via API 315 (e.g. an NBMP Task API). The NBMP workflow manager 320 may use the API 315 to setup, configure, manage, and monitor one or more tasks 341 of a workflow that is performable by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which have several parameters. Additionally, the communications between the NBMP source 310, the NBMP workflow manager 320, the function repository 330, and the MPE 340 may be considered a control flow.

The tasks 341 may each include media processing functions 343 and configurations 342 for the media processing functions 343. Each of the tasks 341 in a respective media processing entity 340 may also communicate with each other facilitating data flow between tasks. In an embodiment, the NBMP workflow manager 320 may select the tasks based on the descriptions of the tasks in the WDD to search the function repository 330, via the function discovery API 312, to find the appropriate functions to run as tasks 341 for a current workflow. The one or more MPE 340 may be configured to receive media content from the media source 350, process the media content in accordance with the workflow, that includes tasks 341, created by the NBMP workflow manager 320, and output the processed media content to the media sink 360. In an embodiment, the one or more MPE 340 may be provided in parallel for multiple media flows 316 and 317 between the media source 350 and the media sink 360, respectively The media source 350 may include memory that stores media and may be integrated with or separate from the NBMP source 310. In an embodiment, the NBMP workflow manager 320 may notify the NBMP source 310 when a workflow is prepared and the media source 350 may transmit media content to the one or more MPE 340 based on the notification that the workflow is prepared and the one or more MPE 340 may transmit the media content to the media sink 360. The communications between the media source 350, the MPE 340, and the media sink 360 may be considered a data flow.

Figure 4:
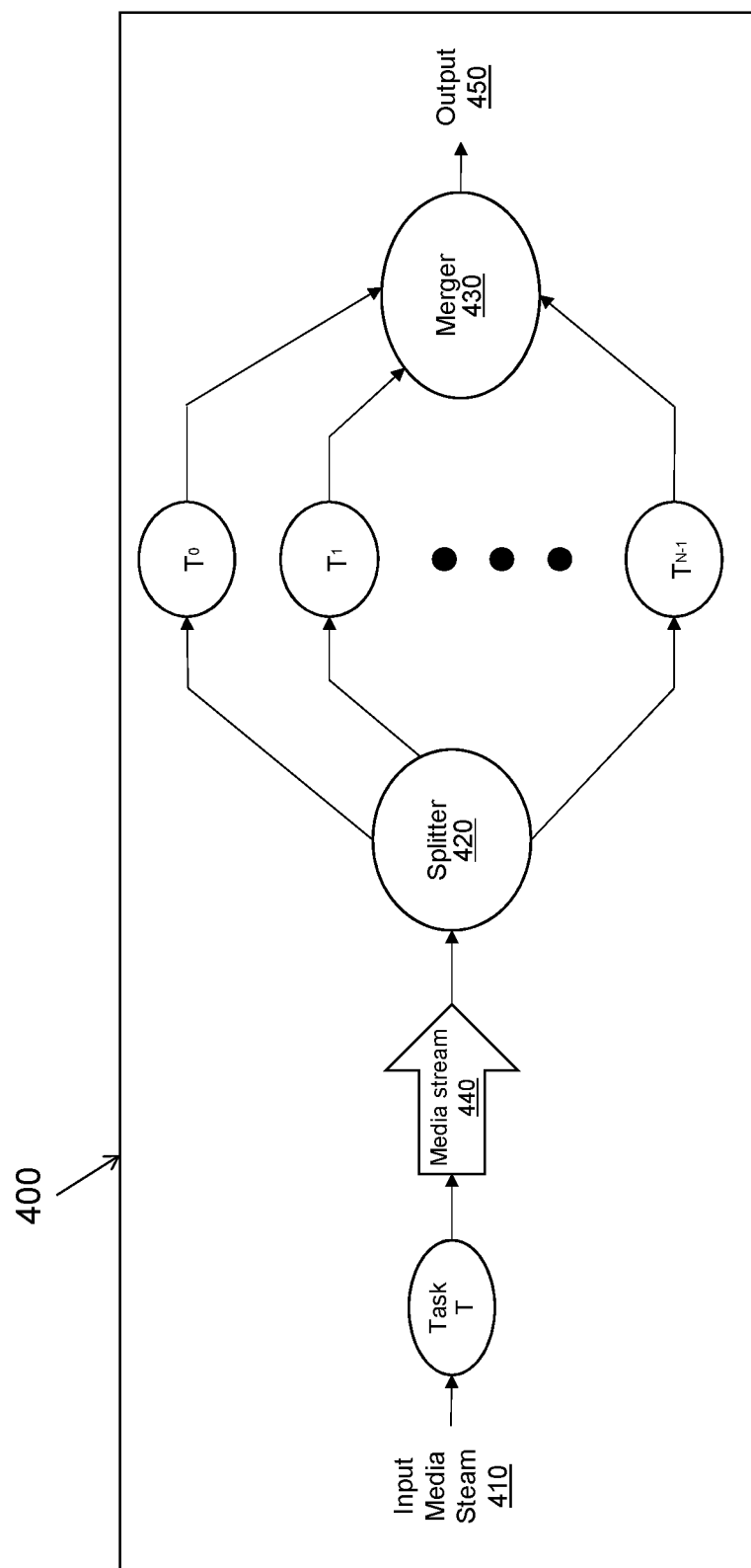
FIG. 4 is an example diagram of an NBMP splitter and merger process according to one or more embodiments.

FIG. 4 shows an example of NBMP splitting and merging segments of a media stream 440 of Task T for parallel processing according to an embodiment of the disclosure. As shown in FIG. 4, the NBMP splitter and merger process 400 includes a splitter 420 and a merger 430. In FIG. 4, Task T of an input media stream is converted to n instances of Task T (i.e., $T_0, \ldots, T_{N-1}$) with the n instances running in parallel. The input media stream 410 may be continuous. The splitter 420 converts the media stream to N media sub-streams. Each sub-stream is processed by an instance of T. The merger 430 then interleaves the sub-streams together to generate an output 450. The output 450 is the equivalent of the output stream of the Task T (i.e., media stream 440).

The 1:N splitter 420 and N:1 merger 430 functions, as shown in FIG. 4, work on the segment boundaries. Each segment has a start, duration, and length metadata associated with it. Since the segments are independent, consequently the sub-streams are independent of each other in terms of being processed by the Task T. In embodiments, Task $T_0, \ldots, T_{N-1}$, are instances of the task T and may process the segments at the same time or separately. Since the segments and sub-streams are independent, each instance of Task T (i.e., $T_0, \ldots, T_{N-1}$) may run at its own speed.

According to an embodiment, a method for scheduling the execution of a workflow or parts of the workflow may be provided. The method may include scheduling a time for processing an entire work flow or scheduling a time for processing tasks of a work flow. According to an embodiment, the workflow maybe divided into a plurality of tasks (i.e., sub-processes), and each of the plurality of tasks in the workflow may be scheduled using any one (or combination) of the following schemes: based on order, based on duration, based on event and based on timeslot. However, the disclosure is not limited thereto, and as such, another scheme may be provided to the scheduling of the tasks (i.e., sub-processes) of the workflow.

According to an embodiment, each of the plurality of tasks may be scheduled based on order. In this case, each task is run or processed once in its entirety, followed by the next task. For example, the method may include scheduling to execute a first task, among the plurality of tasks, in its entirety, and scheduling to execute a second task, among the plurality of tasks, after completion of the first task. That is, each of the plurality of tasks is scheduled to execute (perform) one after another, upon completion of the preceding tasks. Although, the embodiment describes performing the second task after completion of the first task, the disclosure is not limited thereto. As such, according to another embodiment, the second task (or the following task) may begin before the completion of the first task. In this case, a parallel processing of the tasks may be implemented.

According to an embodiment, each of the plurality of tasks may be scheduled based on duration. In this case, each task in the workflow is run for a duration of input or output. For example, the method may include scheduling to execute a first task, among the plurality of tasks, for a period of time, and scheduling to execute a second task, among the plurality of tasks, for a period of time, following the execution of the first task for a period of time. Here, the execution of the first task and the second task may correspond to consuming input media stream or producing output media streams.

According to an embodiment, the first task executing for a period of time may be consuming 1 minute of input media stream or producing 1 minute of output media stream corresponding to the second task. Thereafter, the second task executing for a period of time may be consuming 1 minute of input media stream or producing 1 minute of output media stream corresponding to the second task. Although 1 minute is illustrated as a duration of time, the disclosure is not limited thereto, and as such, according to another embodiment, the duration may be a different amount of time (i.e., 5 minutes of input or output). Moreover, according to another embodiment, the scheduled duration for executing a first task and a second task may be different. For instance, the first task may be scheduled to execute for a first period of time, and the second task is scheduled to execute for a second period of time. According to an embodiment, a parallel processing of the first and second tasks may be implemented.

According to an embodiment, each of the plurality of tasks may be scheduled based on event. In this case, each task in the workflow is run with a start event and stopped with a stop event. For example, the method may include scheduling to execute a first task, among the plurality of tasks, based on occurrence of a first scene of a movie.

According to an embodiment, each of the plurality of tasks may be scheduled based on timeslot. In this case, each task in the workflow starts according to a specific scheduled time. For example, the method may include scheduling to execute a first task, among the plurality of tasks, for 2:00 a.m. to 3:00 a.m.

According to an embodiment, the above described schemes can be run for a group of tasks (or a task group). However, the disclosure is not limited thereto, and as such, according to an embodiment, some of these schemes may be run for an entire workflow. For example, an entire workflow may be scheduled based on duration, based on event or based on timeslot.

A detailed description of each of the scheduling schemes is provided as follows:

Schedule Based on Order

According to an embodiment, Workflow Manager may have to run or execute each task, among a plurality of tasks in a workflow based on order. In this case, the Workflow Manager may start execution of a first task of the workflow having an input media stream, generate output media stream, buffer the output and then start the next task, in a moving wave fashion toward the output. Here, the Workflow Manager may start execution of tasks one after another.

According to an embodiment, the scheduling of the order of tasks may be performed in one of a number of ways, by any one of a number of components in the NBMP system. According to an embodiment, the NBMP Client defines the order of tasks to perform. According to another embodiment, the Workflow Manager deducts the order. However, the disclosure is not limited thereto, and as such, the order of tasks to perform may be defined by another component.

In both cases described above, the Workflow Manager needs to reconfigure the workflow by adding buffer/storage for each output of the task. The Workflow Manager either needs to have the information about the maximum size of these buffers/storages, or each input size is provided so that the Workflow Manager estimates the size of buffer/storage.

According to an embodiment, a 'complete' input may be useful, since every task receiving the 'true' flag at its 'complete' input knows that its task is completed and can generate an event for the Workflow Manager that it is the time of the next task.

According to an embodiment, the NBMP Client and the NBMP Workflow Manager may have the following requirements.

According to an embodiment, the NBMP Client may need to define or indicate/identify a scheme mode (i.e., one of order, duration, event and timeslot) of scheduling. Moreover, in case the scheme mode is scheduled based on duration, the NBMP Client may optionally define the order of tasks. Further, maximum size of storage for each output in workflow or maximum size of the inputs.

According to an embodiment, the NBMP Workflow Manager may have to indicate or signal its capabilities regarding the scheme mode (i.e., one of order, duration, event and timeslot) of scheduling. For example, the NBMP Workflow Manager may have to indicate if the NBMP Workflow supports the scheme mode (i.e., one of order, duration, event and timeslot) of scheduling. In case the scheme mode is schedule based on order, the NBMP Workflow has to indicate whether the NBMP Workflow can derive the order and/or whether the NBMP Workflow can derive the required buffer sizes from inputs sizes. Moreover, the NBMP Workflow may have to acknowledge if the NBMP Workflow can run the request to execute the tasks based on the order scheme mode.

Schedule Based on Duration

According to an embodiment, Workflow Manager may have to run or execute each task, among a plurality of tasks in a workflow based on duration. Here, the method may include scheduling to execute a first task, among the plurality of tasks, for a first duration of time, and scheduling to execute a second task, among the plurality of tasks, for a second duration of time, following the execution of the first task for a period of time. According to an embodiment, the first duration of time and the second duration of time may be same. According to another embodiment, the first duration of time and the second duration of time may be different. According to an embodiment, the duration of time may be 5 minutes of input media stream or output media stream.

In this case, the Workflow Manager may start execution of a first task of the workflow having an input media stream, generate output media stream, buffer the output and then start the next task, in a moving wave fashion toward the output. Here, the Workflow Manager may start execution of tasks one after another. According to an embodiment, the duration of time scheduled for each task may be based on the input media stream or the output media stream. For example, the first task may be executed until 5 minutes of the input media stream is process or 5 minutes of the output media stream is generated.

According to an embodiment, the scheduling of the duration of time for the tasks may be performed in one of a number of ways, by any one of a number of components in the NBMP system. According to an embodiment, the NBMP Client defines the duration of time allocated for the tasks to perform. According to another embodiment, the Workflow Manager deducts the duration of time.

In both cases described above, the Workflow Manager needs to reconfigure the workflow by adding buffer/storage for each output of the task. The Workflow Manager either needs to have the information about the maximum size of these buffers/storages for that specific duration, or each input size is provided, so that the Workflow Manager estimates the size of buffer/storage.

According to an embodiment, the NBMP Client and the NBMP Workflow Manager may have the following requirements.

According to an embodiment, the NBMP Client may need to define or indicate/identify a scheme mode (i.e., one of order, duration, event and timeslot) of scheduling. Moreover, in case the scheme mode is scheduled based on duration, the NBMP Client may define or indicate/identify the duration of input (i.e., input media stream) or the required duration of the output (i.e., output media stream), the order of tasks if needed or provided, the maximum size of storage for each output in workflow or maximum size of the inputs.

According to an embodiment, the NBMP Workflow Manager may have to indicate or signal its capabilities regarding the scheme mode (i.e., one of order, duration, event and timeslot) of scheduling. For example, the NBMP Workflow Manager may have to indicate if the NBMP Workflow supports the scheme mode (i.e., one of order, duration, event and timeslot) of scheduling. In case the scheme mode is schedule based on duration, the NBMP Workflow has to indicate whether the NBMP Workflow can derive the order and/or whether the NBMP Workflow can derive the required buffer sizes from inputs sizes. Further, the NBMP Workflow has to indicate whether the NBMP Workflow can derive a duration of inputs required for the generation of a given duration of the output(s). Moreover, the NBMP Workflow may have to acknowledge if the NBMP Workflow can run the request to execute the tasks based on the order scheme mode.

Schedule Based on Event

According to an embodiment, Workflow Manager may have to run or execute each task, among a plurality of tasks in a workflow based on event. Here, the method may include triggering the start and stop of each task based on an event. According to an embodiment, an event may be a particular scene in a movie, i.e., a first scene in a movie, or a particular portion in an music. According to an embodiment, the events are issued by the Workflow Manager. Since any task has the 'run' state, the Workflow Manager can start the task by changing state of the task to 'run'. To pause a task, the Workflow Manager can change the state of the task to 'idle'. Moreover, since 'idle' does not distinguish between the lack of input vs the request by Workflow Manager to stay as 'idle', according to an embodiment, a new state, i.e., a 'paused' state is provided, in which the task can be changed from 'run' to stay idle even if the inputs are available.

According to an embodiment, the Workflow Manager either can schedule events based on its own internal logic, or it can receive the events from the NBMP Client. Since also in this scheme, the output buffers/storages of each task should be managed.

According to an embodiment, the scheduling of the event trigger for the tasks may be performed in one of a number of ways, by any one of a number of components in the NBMP system. According to an embodiment, the NBMP Client defines the maximum size of intermediate buffers/storages if the events are driven by the NBMP Client. According to another embodiment, the Workflow Manager deducts the size if it schedules its own events to trigger the start and/or stop of processing a task.

In both cases described above, the Workflow Manager may need to reconfigure the workflow by adding buffer/storage for each output of the task. The Workflow Manager either needs to have the information about the maximum size of these buffers/storages for that specific duration, or each input size is provided, so that the Workflow Manager estimates the size of buffer/storage.

According to an embodiment, the NBMP Client, the NBMP Workflow Manager and the NBMP task may have the following requirements.

According to an embodiment, the NBMP Client may need to define or indicate/identify a scheme mode (i.e., one of order, duration, event and timeslot) of scheduling. Moreover, in case the scheme mode is schedule based on event, the NBMP Client may define or indicate/identify whether the event is driven by the NBMP Client or a custom signal for the workflow Manager to start its own event scheme. Further, the NBMP Client may define or indicate/identify maximum size of storage for each output in workflow if it is driven by the NBMP Client.

According to an embodiment, the NBMP Workflow Manager may have to indicate or signal its capabilities regarding the scheme mode (i.e., one of order, duration, event and timeslot) of scheduling. For example, the NBMP Workflow Manager may have to indicate if the NBMP Workflow supports the scheme mode (i.e., one of order, duration, event and timeslot) of scheduling. In case the scheme mode is schedule based on event, the NBMP Workflow has to indicate whether the NBMP Workflow supports Workflow driven events. Moreover, the NBMP Workflow may have to acknowledge if the NBMP Workflow can run the request to execute the tasks based on the order scheme mode.

According to an embodiment, the NBMP Workflow Manager may have to have support of the 'paused' state and support of changing the state between 'run' state and 'paused' state.

Schedule Based on Timeslot

According to an embodiment, the NBMP Client may provide a schedule for each task, among a plurality of tasks in a workflow based on timeslot, and the Workflow Manager runs each task according to the given timeslot. Here, the timeslot may be 2 a.m. to 3 a.m. execute a first task, among the plurality of tasks.

According to an embodiment, the scheduling of the tasks may be performed in one of a number of ways, by any one of a number of components in the NBMP system. According to an embodiment, since intermediate buffers/storage needs to be allocated, the NBMP Client may define the size of buffers.

According to an embodiment, the NBMP Client and the NBMP Workflow Manager may have the following requirements.

According to an embodiment, the NBMP Client may need to define or indicate/identify a scheme mode (i.e., one of order, duration, event and timeslot) of scheduling. Moreover, in case the scheme mode is schedule based on timeslot, the NBMP Client may define or indicate/identify the scheduling mode of each task. For example, the NBMP Client may use an explicit scheduling mode, in which, the schedule has the exact times or the NBMP Client may use an indexed scheduling mode, in which, a start, end, increment, duration scheme (like a for loop) are provided.

Further, the NBMP Client may define or indicate/identify maximum size of storage for each output in workflow if it is driven by the NBMP Client.

According to an embodiment, the NBMP Workflow Manager may have to indicate or signal its capabilities regarding the scheme mode (i.e., one of order, duration, event and timeslot) of scheduling. For example, the NBMP Workflow Manager may have to indicate if the NBMP Workflow supports the scheme mode (i.e., one of order, duration, event and timeslot) of scheduling. In case the scheme mode is schedule based on timeslot, the NBMP Workflow has to indicate whether the NBMP Workflow supports the schedule mode (i.e., the explicit scheduling mode or the indexed scheduling mode). Moreover, the NBMP Workflow may have to acknowledge if the NBMP Workflow can run the request to execute the tasks based on the order scheme mode.

According to the illustrations above, the NBMP Client, the NBMP Workflow Manager and the NBMP task have been shown to perform specific operations. However, the disclosure is not limited to these components to carry out the novel aspects of the disclosure. As such, according to other embodiment, other components (or combination of components in the NBMP system may perform the above discussed operations of the disclosure.

According to an example embodiment, a schedule descriptor may be added to NBMP Standard specification in the following manner:

TABLE 1

Schedule Descriptor

| Parameter Name | Type | Cardinality |
|---|---|---|
| id | P | 1 |
| description | P | 0-1 |
| schedule-type | P | 0-1 |
| order | Array of string | 0-1 |
| duration | P | 0-1 |
| number-of-segments | P | 0-1 |
| io-flag | P | 0-1 |
| run-mode | P | 0-1 |
| timeslot | O | 0-1 |
| status | P | 1 |

According to an embodiment, the schedule descriptor may indicate a parameter name, a type and a cardinality. According to an embodiment, the parameter name may include an identifier (id), a description, a schedule-type, an order, a duration, a number-of-segments, an io-flag, a run-mode, a timeslot and a status. However, the disclosure in not limited to the parameters listed in Table 1, and as such, according to another embodiment, additional parameters may be provided to perform the scheduling of the tasks in the work flow.

Moreover, according to an example embodiment, the timeslot object in the schedule descriptor in Table 1 may include the following parameters illustrated in Table 2:

TABLE 2

Timeslot Object

| Parameter Name | Type | Cardinality |
|---|---|---|
| mode | P | 1 |
| explicit | Array of objects | 0-1 |
| start | P | 0-1 |
| end | P | 0-1 |
| increment | P | 0-1 |
| duration | P | 0-1 |
| timescale | P | 0-1 |

Moreover, according to an example embodiment, the explicit object in the timeslot object in Table 2 may include the following parameters illustrated in Table 3:

TABLE 3

Explicit Object

| Parameter Name | Type | Cardinality |
|---|---|---|
| start | P | 1 |
| end | P | 1 |

Moreover, according to an example embodiment, detail definitions of the schedule descriptor parameters for the NBMP Standard specification may be provided in the following manner:

TABLE 4

Schedule Descriptor Parameters

| Name | Definition | Unit | Type | Valid range |
|---|---|---|---|---|
| Id | unique string indicating the schedule request in the scope of Workflow | N/A | string | N/A |
| description | a human-readable description for the schedule request | N/A | string | N/A |
| schedule-type | type of schedule request, one of the following values:<br>'order': with a specific order<br>'duration': with a specific order and for a specific duration<br>'segment': for a specific number of segments<br>'event': event-driven<br>'timeslot: with a given timeslot schedule<br>The default value is 'order'. | N/A | string | N/A |
| order | The list of task ids in the order of execution for 'schedule-type'='order' or schedule-type'='duration' or schedule-type'='segment' | N/A | string | N/A |
| Duration | The duration of inputs/outputs in unit of the timescale for schedule-type'='duration' | ticks | unsigned integer | N/A |
| timescale | The number of ticks per second used for the duration unit for schedule-type'='duration' | N/A | unsigned integer | N/A |
| number-of-segments | The number of inputs/outputs segments to be processed for schedule-type'='segment' | N/A | unsigned integer | nonzero |
| io-flag | If 'TRUE', then the duration or number of steps are for the outputs, otherwise they are for the inputs, for schedule-type'='duration' or 'schedule-type'='segment'<br>The default value is 'FALSE'. | N/A | boolean | N/A |

TABLE 4-continued

Schedule Descriptor Parameters

| Name | Definition | Unit | Type | Valid range |
|---|---|---|---|---|
| run-mode | The state change when 'schedule-type'='event' 'run': change to the 'run' state. 'pause': change to the 'pause' state | N/A | string | N/A |
| Status | Status of the schedule request, one of the following values: 'capabilities': request the capabilities 'consider': investigate whether such schedule is possible to accommodate 'request': request scheduling 'passed': accommodated/possibleto accommodate 'failed': failed/not possible The default value is 'failed' | N/A | string | N/A |
| Mode | timeslot mode: 'explicit': explicit schedule with specific start and end time 'indexed': implicit by defining start, end, increments, and duration. The default value is 'explicit'. | N/A | string | N/A |
| Start | Start time of the timeslot for the task in 'run' mode. | | | |
| End | end time of the timeslot for the task in 'run' mode. | | | |
| increment | The increments of time to the next start time in the scale of timescale | N/A | unsigned integer | N/A |
| Duration | The duration of time for this increment, in the scale of timescale | N/A | unsigned integer | N/A |

According to an embodiment the schedule descriptor may be used in the following manner. For example, the NBMP Client can include schedule descriptor in a workflow description document(s) (WDD) update call for any of the following:

Get capabilities of Workflow Manager by including the schedule descriptor in WDD and 'status'='capabilities';

Scheduling the Workflow by including it in WDD;

Scheduling a task by including the schedule descriptor in a Task Description Document (TDD);

Scheduling a group of tasks by including the schedule descriptor in a Task group object; and Consider scheduling any of the above by requesting with 'status'='consider' to see if the workflow can manage the schedule if the schedule descriptor is requested.

However, the disclosure is not limited to the use of schedule descriptor as discussed above. As such, according to another example embodiment, the schedule descriptor may be used in another manner by the NBMP system.

Figure 5:
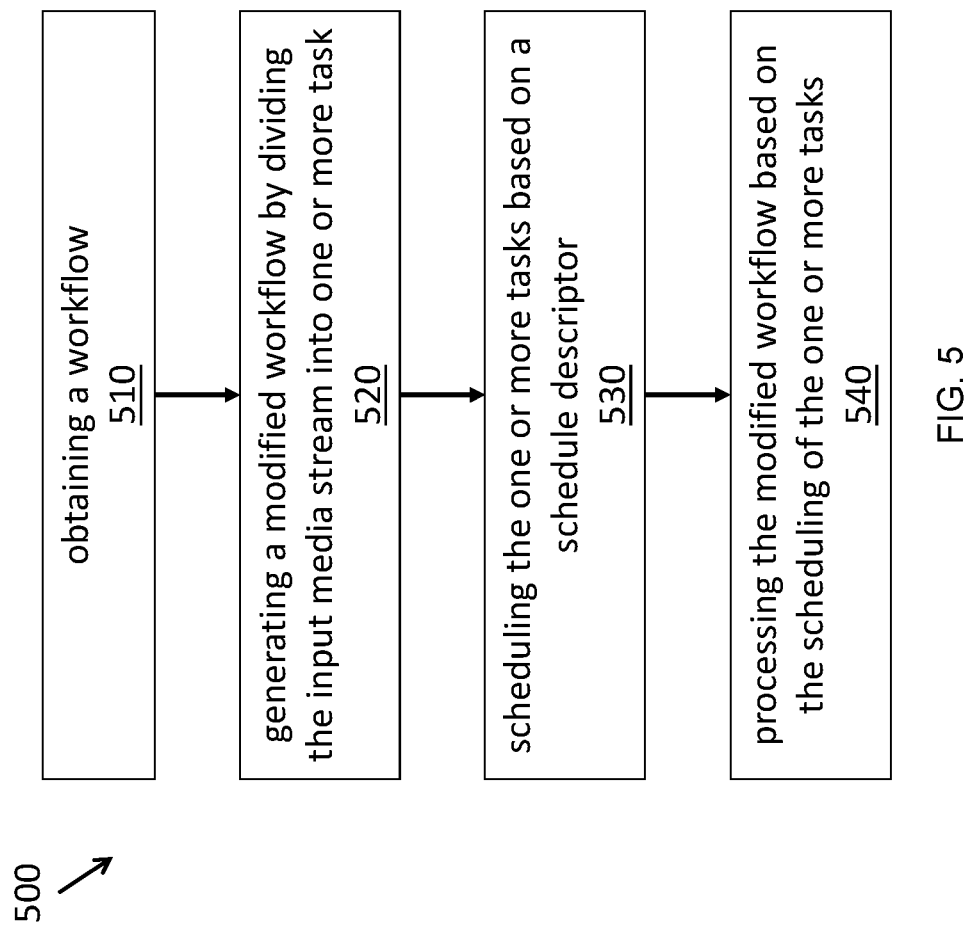
FIG. 5 is a block diagram of an example process for scheduling a Network Based Media Processing (NBMP) workflow or a part of the workflow on cloud platforms, according to one or more embodiments.

FIG. 5 is a flowchart of an example method 500 for scheduling a Network Based Media Processing (NBMP) workflow on a cloud platform according to one or more embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes obtaining a workflow. The workflow may include input media stream.

In operation 520, the method 500 includes generating a modified workflow by dividing the input media stream into one or more tasks.

In operation 530, the method 500 includes scheduling the one or more tasks on the cloud platform based on a schedule descriptor, which includes schedule type information. According to an embodiment, the schedule descriptor includes command information corresponding to the schedule type information, and wherein the command information includes information for: obtaining capabilities of the cloud platform, determining whether the scheduling type information in a scheduling request is implementable and/or providing response including a result of the determining whether the scheduling type information in the scheduling request is implementable.

According to an embodiment, the schedule type information includes one of order information, duration information, event information or timeslot information. According to an embodiment, based on a determination that the schedule type information is the order information, scheduling to execute each of the one or more tasks in an order. According to an embodiment, based on a determination that the schedule type information is the duration information, scheduling to execute a first task, among the one or more tasks, for a first duration of time. According to an embodiment, based on a determination that the schedule type information is the event information, scheduling to execute a first task, among the one or more tasks, based on occurrence of an event in the input media stream as a trigger to start or stop the execution of the first task. In the executing of the one or more tasks based on the event information, a new paused state is defined for each of the one or more tasks, in which, each of the one or more tasks maintains an internal state and information while not processing any further data in the respective task. According to an embodiment, based on a determination that the schedule type information is the timeslot information, scheduling to execute a first task, among the one or more tasks, in a specified timeslot. The timeslot information includes: an explicit scheduling mode, in which, an exact time frame is provided for the scheduling; or an indexed scheduling mode, in which, a start, end, increment, duration scheme are provided for the scheduling.

In operation 540, the method 500 includes processing the modified workflow based on the scheduling of the one or more tasks.

Although FIG. 5 shows example blocks of the method, in some implementations, the method may include additional blocks, fewer blocks, different blocks, or differently arranged blocks than those depicted in FIG. 5. Additionally, or alternatively, two or more of the blocks of the method may be performed in parallel.

Figure 6:
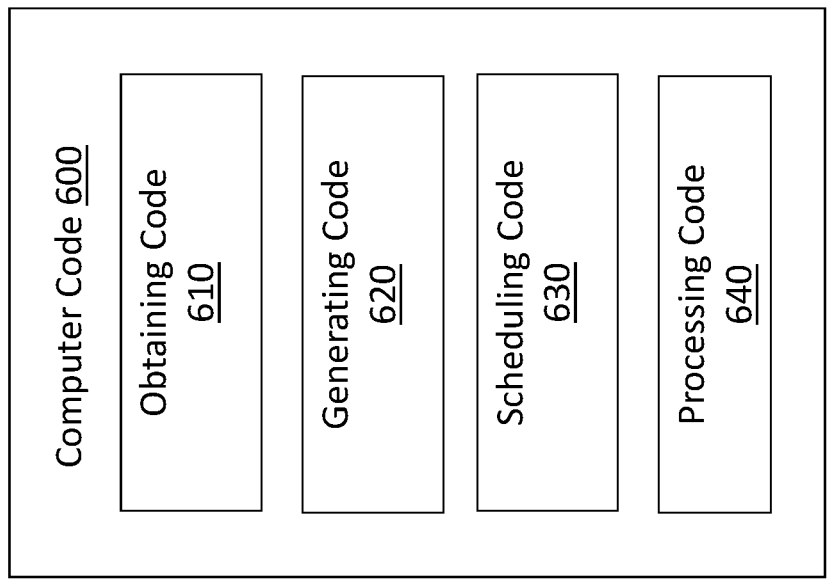
FIG. 6 is a block diagram of an example of computer code for scheduling a Network Based Media Processing (NBMP) workflow or a part of the workflow on cloud platforms, according to one or more embodiments.

FIG. 6 is a block diagram of an example of computer code for scheduling a Network Based Media Processing (NBMP) workflow on a cloud platform according to one or more embodiments.

According to embodiments of the disclosure, at least one processor with memory storing computer code may be provided. The computer code may be configured to, when executed by the at least one processor, perform any number of aspects of the disclosure.

For example, with reference to FIG. 6, computer code 600 may be implemented in the NBMP system 300.

As shown in FIG. 6, the computer code 600 may include obtaining code 610, generating code 620, scheduling code 630 and processing code 640.

The obtaining code 610 may include code configured to cause the at least one processor to obtain an input workflow including input media stream.

The generating code 620 may include code configured to cause the at least one processor to generate a modified workflow by dividing the input media stream into one or more tasks;

The scheduling code 630 may include code configured to cause the at least one processor to schedule the one or more tasks on the cloud platform based on a schedule descriptor, which includes schedule type information.

The processing code 640 may include code configured to cause the at least one processor to process the modified workflow based on the scheduling of the one or more tasks.

Although FIG. 6 shows example blocks of the computer code 600 of an apparatus or device according to embodiments, in some implementations, the apparatus may include additional blocks, fewer blocks, different blocks, or differently arranged blocks than those depicted in FIG. 6. Additionally, or alternatively, two or more of the blocks of the apparatus may be combined.

The techniques for scheduling a Network Based Media Processing (NBMP) workflow on a cloud platform described above may be used separately or combined in any order. Further, each of the methods (or embodiments) may be implemented by processing circuitry (e.g., one or more processors or one or more integrated circuits). In one example, the one or more processors may execute a program that is stored in a non-transitory computer-readable medium.

The disclosure provides illustration and description, but is not intended to be exhaustive or to limit the implementations to the precise form disclosed. Modifications and variations are possible in light of the disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for scheduling a Network Based Media Processing (NBMP) workflow on a cloud platform, the method comprising:
obtaining an input workflow including input media stream;
generating a modified workflow by dividing the input media stream into one or more tasks;
scheduling the one or more tasks on the cloud platform based on a schedule descriptor, which includes schedule type information and includes a scale descriptor; and
processing the modified workflow based on the scheduling of the one or more tasks,
wherein the scale descriptor consists of parameter names: id, description, schedule-type, order, duration, number of segments, io-flag, run-mode, timeslot, and status, and
wherein timeslot is, at least in the scale descriptor, an object consisting of parameter names: mode, explicit, start, end, increment, duration, and timescale, and
wherein explicit is an array of objects and consists of parameter names: start and end.

2. The method of claim 1, wherein the schedule type information includes one of order information, duration information, event information or timeslot information, and
wherein id is a unique string indicating a schedule request in scope of a workflow, description is a human-readable description for a schedule request, schedule-type comprises one of order, duration, segment, event, and timeslot, order comprises a list of task ids in order, duration is a duration of inputs and outputs in a unit of timescale for duration, timescale is a number of ticks per second for duration, number of segments is a number of inputs and outputs to be processed for segment, and io-flag indicates whether a duration or number of steps are for outputs or inputs for any of duration and segment and with a default value of false, run-mode is a state change for event, status comprises one of values capabilities, consider, request, passed, and failed with failed being default, and wherein "order" is a default value of schedule-type.

3. The method of claim 2, further comprising:
based on a determination that the schedule type information is the order information, scheduling to execute each of the one or more tasks in an order.

4. The method of claim 2, further comprising:
based on a determination that the schedule type information is the duration information, scheduling to execute a first task, among the one or more tasks, for a first duration of time.

5. The method of claim 2, further comprising:
based on a determination that the schedule type information is the event information, scheduling to execute a first task, among the one or more tasks, based on occurrence of an event in the input media stream as a trigger to start or stop the execution of the first task.

6. The method of claim 5, wherein, in the executing of the one or more tasks based on the event information, a new paused state is defined for each of the one or more tasks, in which, each of the one or more tasks maintains an internal state and information while not processing any further data in the respective task.

7. The method of claim 2, further comprising:
based on a determination that the schedule type information is the timeslot information, scheduling to execute a first task, among the one or more tasks, in a specified timeslot.

8. The method of claim 7, wherein the timeslot information further comprises:
an explicit scheduling mode, in which, an exact time frame is provided for the scheduling; or
an indexed scheduling mode, in which, a start, end, increment, duration scheme are provided for the scheduling.

9. The method of claim 1, wherein the schedule descriptor includes command information corresponding to the schedule type information, and
wherein the command information includes information for:
obtaining capabilities of the cloud platform,
determining whether the scheduling type information in a scheduling request is implementable; or
providing response including a result of the determining whether the scheduling type information in the scheduling request is implementable.

10. An apparatus for scheduling a Network Based Media Processing (NBMP) workflow on a cloud platform, the apparatus comprising:
at least one memory configured to store program code; and
at least one processor configured to read the program code and operate as instructed by the program code, the program code including:
obtaining code configured to cause the at least one processor to obtain an input workflow including input media stream;
generating code configured to cause the at least one processor to generate a modified workflow by dividing the input media stream into one or more tasks;
scheduling code configured to cause the at least one processor to schedule the one or more tasks on the cloud platform based on a schedule descriptor, which includes schedule type information and includes a scale descriptor; and
processing code configured to cause the at least one processor to process the modified workflow based on the scheduling of the one or more tasks,
wherein the scale descriptor consists of parameter names: id, description, schedule-type, order, duration, number of segments, io-flag, run-mode, timeslot, and status, and
wherein timeslot is, at least in the scale descriptor, an object consisting of parameter names: mode, explicit, start, end, increment, duration, and timescale, and
wherein explicit is an array of objects and consists of parameter names: start and end.

11. The apparatus of claim 10, wherein the schedule type information includes one of order information, duration information, event information or timeslot information,
wherein id is a unique string indicating a schedule request in scope of a workflow, description is a human-readable description for a schedule request, schedule-type comprises one of order, duration, segment, event, and timeslot, order comprises a list of task ids in order, duration is a duration of inputs and outputs in a unit of timescale for duration, timescale is a number of ticks per second for duration, number of segments is a number of inputs and outputs to be processed for segment, and io-flag indicates whether a duration or number of steps are for outputs or inputs for any of duration and segment and with a default value of false, run-mode is a state change for event, status comprises one of values capabilities, consider, request, passed, and failed with failed being default, and wherein "order" is a default value of schedule-type.

12. The apparatus of claim 11, wherein the scheduling code is further configured to cause the at least one processor to, based on a determination that the schedule type information is the order information, scheduling to execute each of the one or more tasks in an order.

13. The apparatus of claim 11, wherein the scheduling code is further configured to cause the at least one processor to, based on a determination that the schedule type information is the duration information, scheduling to execute a first task, among the one or more tasks, for a first duration of time.

14. The apparatus of claim 11, wherein the scheduling code is further configured to cause the at least one processor to, based on a determination that the schedule type information is the event information, scheduling to execute a first task, among the one or more tasks, based on occurrence of an event in the input media stream as a trigger to start or stop the execution of the first task.

15. The apparatus of claim 14, wherein, in the executing of the one or more tasks based on the event information, a new paused state is defined for each of the one or more tasks, in which, each of the one or more tasks maintains an internal state and information while not processing any further data in the respective task.

16. The apparatus of claim 11, wherein the scheduling code is further configured to cause the at least one processor to, based on a determination that the schedule type information is the timeslot information, scheduling to execute a first task, among the one or more tasks, in a specified timeslot.

17. The apparatus of claim 16, wherein the timeslot information further comprises:

an explicit scheduling mode, in which, an exact time frame is provided for the scheduling; or an indexed scheduling mode, in which, a start, end, increment, duration scheme are provided for the scheduling.

18. The apparatus of claim 11, wherein the schedule descriptor includes command information corresponding to the schedule type information, and wherein the command information includes information for:
obtaining capabilities of the cloud platform,
determining whether the scheduling type information in a scheduling request is implementable; or
providing response including a result of the determining whether the scheduling type information in the scheduling request is implementable.

19. A non-transitory computer readable medium storing instructions, the instructions comprising: one or more instructions that, when executed by at least one processor of an apparatus for scheduling a Network Based Media Processing (NBMP) workflow on a cloud platform, cause the at least one processor to:

obtain an input workflow including input media stream;
generate a modified workflow by dividing the input media stream into one or more tasks;
schedule the one or more tasks on the cloud platform based on a schedule descriptor, which includes schedule type information and includes a scale descriptor; and
process the modified workflow based on the scheduling of the one or more tasks, and wherein the scale descriptor consists of parameter names: id, description, schedule-type, order, duration, number of segments, io-flag, run-mode, timeslot, and status, and wherein timeslot is, at least in the scale descriptor, an object consisting of parameter names: mode, explicit, start, end, increment, duration, and timescale, and wherein explicit is an array of objects and consists of parameter names: start and end.

20. The non-transitory computer readable medium of claim 19, wherein the schedule type information includes one of order information, duration information, event information or timeslot information, wherein id is a unique string indicating a schedule request in scope of a workflow, description is a human-readable description for a schedule request, schedule-type comprises one of order, duration, segment, event, and timeslot, order comprises a list of task ids in order, duration is a duration of inputs and outputs in a unit of timescale for duration, timescale is a number of ticks per second for duration, number of segments is a number of inputs and outputs to be processed for segment, and io-flag indicates whether a duration or number of steps are for outputs or inputs for any of duration and segment and with a default value of false, run-mode is a state change for event, status comprises one of values capabilities, consider, request, passed, and failed with failed being default, and wherein "order" is a default value of schedule-type.

* * * * *